United States Patent
Howard et al.

(10) Patent No.: US 12,405,174 B2
(45) Date of Patent: Sep. 2, 2025

(54) PHOTONIC MARKERS ENABLING TEMPERATURE SENSING AND/OR SECURITY MARKING USING LOW FRAME RATE CAMERAS

(71) Applicant: Karlsruher Institut für Technologie, Karlsruhe (DE)

(72) Inventors: Ian Howard, Karlsruhe (DE); Dmitry Busko, Bruchsal (DE); Guojun Gao, Stutensee (DE); Ngei Katumo, Eggenstein-Leopoldshafen (DE); Andrey Turshatov, Griesheim (DE); Bryce Richards, Stutensee-Blankenloch (DE)

(73) Assignee: KARLSRUHER INSTITUTE FUR TECHNOLOGIE (DE)

( * ) Notice: Subject to any disclaimer, the term of this patent is extended or adjusted under 35 U.S.C. 154(b) by 499 days.

(21) Appl. No.: 17/788,383

(22) PCT Filed: Dec. 23, 2020

(86) PCT No.: PCT/EP2020/087756
§ 371 (c)(1),
(2) Date: Jun. 23, 2022

(87) PCT Pub. No.: WO2021/130304
PCT Pub. Date: Jul. 1, 2021

(65) Prior Publication Data
US 2023/0022560 A1    Jan. 26, 2023

(30) Foreign Application Priority Data
Dec. 23, 2019    (EP) .................................. 19219261

(51) Int. Cl.
*G01N 21/63*    (2006.01)
*G01K 11/32*    (2021.01)

(52) U.S. Cl.
CPC ............. *G01K 11/32* (2013.01); *G01N 21/63* (2013.01)

(58) Field of Classification Search
CPC ..... G01K 11/32; G01N 21/63; C09K 11/7789
See application file for complete search history.

(56) References Cited

U.S. PATENT DOCUMENTS

| 5,674,698 A | 10/1997 | Zarling et al. |
|---|---|---|
| 7,067,824 B2 | 6/2006 | Muller et al. |

(Continued)

FOREIGN PATENT DOCUMENTS

| CN | 1429379 | 7/2003 |
|---|---|---|
| CN | 108292485 | 7/2018 |

(Continued)

OTHER PUBLICATIONS

Andrew "Persistent Luminescent Nanophosphors as Reporters for Sensitive Diagnostics", A Dissertation presented to the Faculty of the Department of Chemical and Biomolecular Engineering, University of Houston, May 2016, p. 1-210 (Year: 2016).*

(Continued)

*Primary Examiner* — David P Porta
*Assistant Examiner* — Mamadou Faye
(74) *Attorney, Agent, or Firm* — Onello & Mello P.C.

(57) ABSTRACT

The present invention relates to a system, method and computer-program for evaluating the photoluminescence of a photonic marker as well as to a photonic marker for temperature sensing and/or security marking and to the use of the photonic marker for temperature sensing and/or security marking. The photonic marker according to an aspect of the present invention comprises a host material selected from the group consisting of a rare earth element oxysulfide and strontium aluminate, wherein the host material is doped with $Eu^{3+}$ or $Eu^{2+}$ as a dopant.

9 Claims, 12 Drawing Sheets

(56) References Cited

U.S. PATENT DOCUMENTS

| | | | |
|---|---|---|---|
| 10,379,046 B2 | 8/2019 | Katzlinger et al. | |
| 2004/0031931 A1 | 2/2004 | Muller et al. | |
| 2006/0180792 A1 | 8/2006 | Ricci et al. | |
| 2010/0231692 A1* | 9/2010 | Perlman | G06T 7/596 |
| | | | 348/48 |
| 2011/0038947 A1* | 2/2011 | Maurer | C09K 11/7795 |
| | | | 252/301.5 |
| 2015/0105284 A1* | 4/2015 | Willson | G01N 33/5434 |
| | | | 435/5 |
| 2016/0299076 A1 | 10/2016 | Katzlinger et al. | |
| 2018/0282618 A1* | 10/2018 | Fernández Lozano | C09D 5/22 |
| 2018/0320069 A1 | 11/2018 | O'Kell et al. | |
| 2022/0204838 A1* | 6/2022 | Li | C09K 11/06 |

FOREIGN PATENT DOCUMENTS

| | | | | |
|---|---|---|---|---|
| EP | 1043681 | 10/2000 | | |
| WO | WO-2004096944 A1 * | 11/2004 | | C09K 11/02 |
| WO | 2018211829 | 11/2018 | | |

OTHER PUBLICATIONS

European Office Action dated Jun. 5, 2024 issued European Application No. 20842223.8.
Chinese Office Action dated May 25, 2023 issued in corresponding Chinese Application No. 202080089395.0, with English translation.
International Search Report and Written Opinion dated Mar. 24, 2021 issued in corresponding International Application No. PCT/EP2020/087756.

* cited by examiner

PHOTONIC MARKERS ENABLING TEMPERATURE SENSING AND/OR SECURITY MARKING USING LOW FRAME RATE CAMERAS

The present invention relates to a system, method and computer-program product for evaluating the photoluminescence of a photonic marker as well as to a photonic marker for temperature sensing and/or security marking and to the use of the photonic marker for temperature sensing and/or security marking.

Photonic markers are used in different fields of technology for various applications. In some applications, the photoluminescence lifetime of the photonic markers is evaluated. In order to do so, specialized detectors, such as high-speed cameras, are usually required which are capable of detecting the photoluminescence intensity of the photonic markers in a time-resolved manner. So far, evaluating the photoluminescence lifetime of photonic markers which are commercially available is often associated with high costs and complicated handling.

In a first aspect, the present invention provides a system for evaluating the photoluminescence of a photonic marker, the system comprising:

at least one photonic marker comprising a host material selected from the group consisting of a rare earth element oxysulfide and strontium aluminate, wherein the host material is doped with $Eu^{3+}$ or $Eu^{2+}$ as a dopant; and an excitation unit configured to excite the at least one photonic marker so that the at least one photonic marker emits photoluminescence, the intensity of which decays over time.

The system may further comprise:

a detection unit configured to detect the photoluminescence intensity of the at least one photonic marker in a time-resolved manner.

Alternatively, the photoluminescence intensity of the at least one photonic marker may be detected visually, e.g., by means of the human eye of an observer.

Herein, the photoluminescence intensity which decays over time is also referred to as time-resolved photoluminescence intensity.

The host material may be doped with the dopant at a dopant concentration in the range of from 0.001 to 20 mol %, such as in the range of from 0.1 to 20 mol %, based on the molar amount of the host material such that there is a photoluminescence lifetime of the photonic marker in the range of from 20 to 1000 ms at room temperature.

Herein, the photoluminescence lifetime is to be understood as the time at which the photoluminescence intensity of the photonic marker reaches a value of $1/e=36.8\%$ of the initial photoluminescence intensity in a given time window. Room temperature is to be understood as a temperature of 25° C.

The host material may be further doped with $Dy^{3+}$ as a codopant.

The host material may be doped with the codopant at a codopant concentration in the range of from 0.001 to 20 mol %, such as in the range of from 0.1 to 20 mol %, based on the molar amount of the host material.

The host material may be selected from the group consisting of gadolinium oxysulfide and yttrium oxysulfide.

The dopant may be $Eu^{3+}$.

The host material may be strontium aluminate, the host material being doped with $Eu^{2+}$ or $Eu^{3+}$ as the dopant, preferably doped with $Eu^{2+}$ as the dopant, and codoped with $Dy^{3+}$ as the codopant.

$Sr_{0.95}Eu_{0.02}Dy_{0.03}Al_2O_4$ may be mentioned as an exemplary photonic marker.

The detection unit, if present, may be a video camera having a frame rate of equal to or more than 20 fps and equal to or less than 2000 fps. Preferably, the detection unit, if present, may be a video camera having a frame rate of equal to or more than 20 fps and equal to or less than 1000 fps.

The system may further comprise:

a determination unit for temperature sensing configured to determine the temperature of a sample to which the at least one photonic marker is added by comparing the time-resolved photoluminescence intensity of the at least one photonic marker with a predetermined temperature-dependent photoluminescence profile of the at least one photonic marker.

Herein, the at least one photonic marker which usually has a powdery form may be added to the sample, i.e., to an item to be marked, by any means known in the art. For example, the at least one photonic marker may be introduced into or onto the item to be marked. The photonic marker may be introduced into or onto the item to be marked in a variety of forms including an ink, varnish, or glue. It may also be introduced into or onto the bulk of the material constituting the item to be marked, for example by extrusion processes, injection molding, or 3D printing.

Alternatively, or in addition thereto, the system may further comprise:

a determination unit for security marking configured to determine the authenticity of a sample to which the at least one photonic marker is added by comparing the time-resolved photoluminescence intensity of the at least one photonic marker with a predetermined photoluminescence profile of the at least one photonic marker at a given temperature.

The excitation unit may be a pulsed light source having an excitation wavelength in the range of from 380 to 700 nm.

One or more of the units of the system may be part of a portable electronic device, in particular a mobile phone, e.g. a smartphone, or a tablet computer.

In a second aspect, the present invention provides a method for evaluating the photoluminescence of a photonic marker, the method comprising the steps of:

providing at least one photonic marker comprising a host material selected from the group consisting of a rare earth element oxysulfide and strontium aluminate, wherein the host material is doped with $Eu^{3+}$ or $Eu^{2+}$ as a dopant;

exciting the at least one photonic marker so that the at least one photonic marker emits photoluminescence, the intensity of which decays over time; and detecting the photoluminescence intensity of the at least one photonic marker in a time-resolved manner.

The method may further comprise the step of:

determining the temperature of a sample to which the at least one photonic marker is added by comparing the time-resolved photoluminescence intensity of the at least one photonic marker with a predetermined temperature-dependent photoluminescence profile of the at least one photonic marker.

Alternatively, or in addition thereto, the method may further comprise the step of:

determining the authenticity of a sample to which the at least one photonic marker is added by comparing the time-resolved photoluminescence intensity of the at least one photonic marker with a predetermined photoluminescence profile of the at least one photonic marker at a given temperature.

In a third aspect, the present invention provides a computer-program product for evaluating the photoluminescence of a photonic marker, wherein the computer-program product comprises computer-readable instructions, which when loaded and run by a processor of an electronic device, cause the electronic device to perform a method comprising the steps of:

generating and outputting an excitation signal to an excitation unit for exciting at least one photonic marker comprising a host material selected from the group consisting of a rare earth element oxysulfide and strontium aluminate, wherein the host material is doped with $Eu^{3+}$ or $Eu^{2+}$ as a dopant, so that the at least one photonic marker emits photoluminescence, the intensity of which decays over time; and detecting, by a detection unit, the photoluminescence intensity of the at least one photonic marker in a time-resolved manner.

The computer-program product and the method to which it relates may further comprise the step of:

determining, by a determination unit for temperature sensing, the temperature of a sample to which the at least one photonic marker is added by comparing the time-resolved photoluminescence intensity of the at least one photonic marker with a predetermined temperature-dependent photoluminescence profile of the at least one photonic marker.

Alternatively, or in addition thereto, the computer-program product and the method to which it relates may further comprise the step of:

determining, by a determination unit for security marking, the authenticity of a sample to which the at least one photonic marker is added by comparing the time-resolved photoluminescence intensity of the at least one photonic marker with a predetermined photoluminescence profile of the at least one photonic marker at a given temperature.

In a fourth aspect, the present invention provides a photonic marker for temperature sensing and/or security marking, comprising a host material selected from the group consisting of a rare earth element oxysulfide and strontium aluminate, wherein the host material is doped with $Eu^{3+}$ or $Eu^{2+}$ as a dopant.

The host material may be doped with the dopant at a dopant concentration in the range of from 0.001 to 20 mol %, such as in the range of from 0.1 to 20 mol %, based on the molar amount of the host material such that there is a photoluminescence lifetime of the photonic marker in the range of from 20 to 1000 ms at room temperature.

The host material may be further doped with $Dy^{3+}$ as a codopant.

The host material may be doped with the codopant at a codopant concentration in the range of from 0.001 to 20 mol %, such as in the range of from 0.1 to 20 mol %, based on the molar amount of the host material.

The host material may be selected from the group consisting of gadolinium oxysulfide and yttrium oxysulfide.

The dopant may be $Eu^{3+}$.

The host material may be strontium aluminate, the host material being doped with $Eu^{2+}$ or $Eu^{3+}$ as the dopant, preferably doped with $Eu^{2+}$ as the dopant, and codoped with $Dy^{3+}$ as the codopant. Without limitation, $Sr_{0.95}Eu_{0.02}Dy_{0.03}Al_2O_4$ may be mentioned as an exemplary photonic marker.

Finally, in a fifth aspect, the present invention provides the use of at least one photonic marker comprising a host material selected from the group consisting of a rare earth element oxysulfide and strontium aluminate, wherein the host material is doped with $Eu^{3+}$ or $Eu^{2+}$ as a dopant, for temperature sensing and/or security marking.

As surprisingly found by the present inventors, by doping a specific host material, i.e., a rare earth element oxysulfide or strontium aluminate ($SrAl_2O_4$), with a specific dopant, i.e., trivalent europium ions ($Eu^{3+}$) or divalent europium ions ($Eu^{2+}$), at a specific dopant concentration, e.g., in the range of from 0001 to 20 mol %, such as in the range of from 0.1 to 20 mol %, based on the molar amount of the rare earth element oxysulfide or strontium aluminate used as the host material, it is possible to obtain a photonic marker with a tailored variety of photoluminescence lifetimes on the order of tens to hundreds of milliseconds at room temperature. Advantageously, the photonic marker according to an aspect of the present invention can be used in applications like temperature sensing and/or security marking without causing high costs and requiring complicated handling. In particular, low cost and easy-to-handle excitation and detection units may be suitably used in these applications for evaluating the photoluminescence of the photonic marker. Further, in some embodiments, it is even possible to visually detect the photoluminescence intensity of the photonic marker without using a detection unit.

Figure 1:
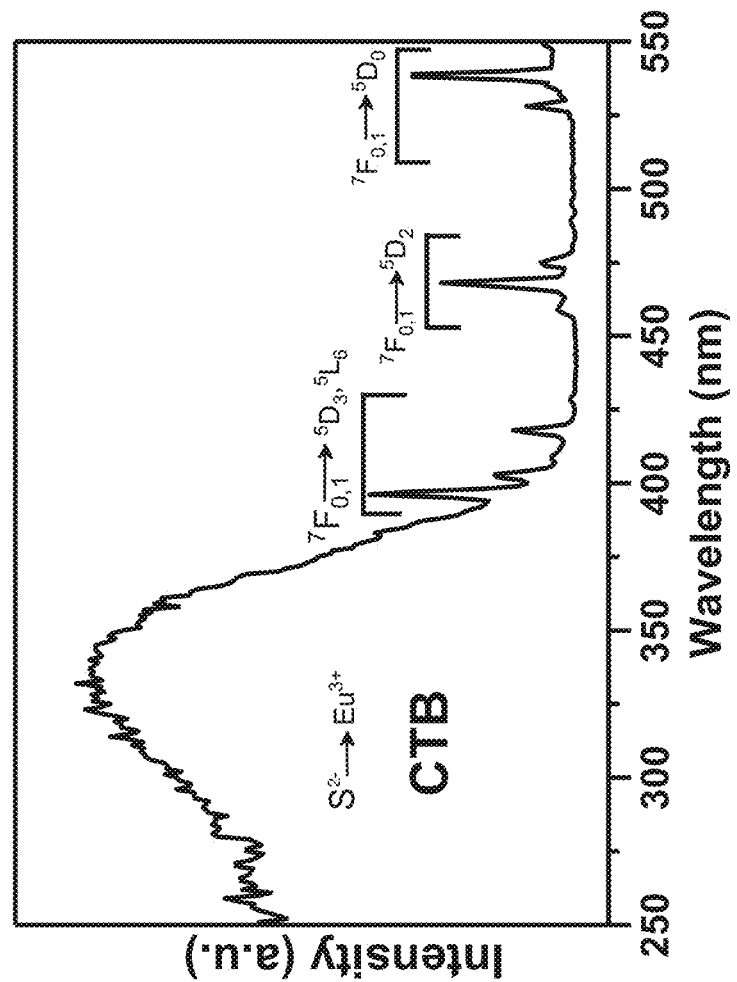
FIG. 1 shows the absorption spectrum of gadolinium oxysulfide doped with $Eu^{3+}$ at a dopant concentration of 6 mol % from diffuse reflectance.

In the following, a detailed description of examples will be given with reference to the drawings. It should be understood that various modifications to the examples may be made. In particular, one or more elements of one example may be combined and used in other examples to form new examples.

The photonic marker for sensing and/or security marking according to an aspect of the present invention comprises a host material selected from the group consisting of a rare earth element oxysulfide and strontium aluminate, wherein the host material is doped with a dopant selected from the group consisting of $Eu^{3+}$ and $Eu^{2+}$. In other words, the photonic marker for sensing and/or security marking according to an aspect of the present invention is a rare earth element oxysulfide or strontium aluminate doped with $Eu^{3+}$ or $Eu^{2+}$, also sometimes referred to herein as rare earth element phosphor and strontium aluminate phosphor. That is, a rare earth element oxysulfide or strontium aluminate acts as the host material and trivalent europium ions or divalent europium ions act as the dopant. Accordingly, the photonic marker may be a rare earth element oxysulfide doped with $Eu^{3+}$ or a rare earth element oxysulfide doped with $Eu^{2+}$, or may be strontium aluminate doped with $Eu^{3+}$ or strontium aluminate doped with $Eu^{2+}$.

Without limitation, the dopant concentration, i.e., the concentration of $Eu^{3+}$ or the concentration of $Eu^{2+}$, may be in the range of from 0.1 to 20 mol % based on the molar amount of the host material, i.e., the molar amount of the rare earth element oxysulfide or the molar amount of strontium aluminate. For example, the dopant concentration may be in the range of from 0.5 to 15 mol % based on the molar amount of the host material, without, however, being limited thereto. Further, the dopant concentration may also be in the range of from 0.001 to 0.1 mol % based on the molar amount of the host material, without, however, being limited thereto. In particular, herein, the dopant concentration may be in the range of from 0.001 to 20 mol %, e.g., in the range of from 0.001 to 15 mol % or in the range of from 0.01 to 15 mol %, based on the molar amount of the host material.

Herein, the rare earth element of the rare earth element oxysulfide is not further limited and may be any rare earth element which can be used for rare earth element oxysulfides, including cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

Without limitation, the rare earth element may be gadolinium or yttrium. Accordingly, the rare earth element oxysulfide used as the host material may be selected from the group consisting of gadolinium oxysulfide ($Gd_2O_2S$) and yttrium oxysulfide ($Y_2O_2S$). Both gadolinium oxysulfide and yttrium oxysulfide are well-known host materials frequently used for cathode luminescence and X-ray scintillation. $Gd_2O_2S$ and $Y_2O_2S$ doped with $Eu^{3+}$ are sometimes referred to as $Gd_2O_2S:Eu^{3+}$ and $Y_2O_2S:Eu^{3+}$ herein.

The host material of the photonic marker may be further doped with trivalent dysprosium ions ($Dy^{3+}$) as a codopant. The concentration of $Dy^{3+}$ may be in the range of from 0.1 to 20 mol % based on the molar amount of the host material, i.e., the molar amount of the rare earth element oxysulfide or the molar amount of strontium aluminate. For example, the codopant concentration may be in the range of from 0.5 to 15 mol % based on the molar amount of the host material, without, however, being limited thereto. Further, the codopant concentration may also be in the range of from 0.001 to 0.1 mol % based on the molar amount of the host material, without, however, being limited thereto. In particular, herein, the codopant concentration may be in the range of from 0.001 to 20 mol %, e.g., in the range of from 0.001 to 15 mol % or in the range of from 0.01 to 15 mol %, based on the molar amount of the host material.

FIG. 1 shows the absorption spectrum of $Gd_2O_2S:Eu^{3+}$ at a dopant concentration of 6 mol % from diffuse reflectance. The strong absorption having a maximum at around 350 nm is due to a charge-transfer band (CTB) resulting from an electron transfer between $O^{2-}$, $S^{2-}$ and $Eu^{3+}$. Beside the charge-transfer band, there are several distinct absorption peaks at higher wavelengths in the absorption spectrum, which are attributable to atomic electron transitions within the trivalent europium ion.

Figure 2:
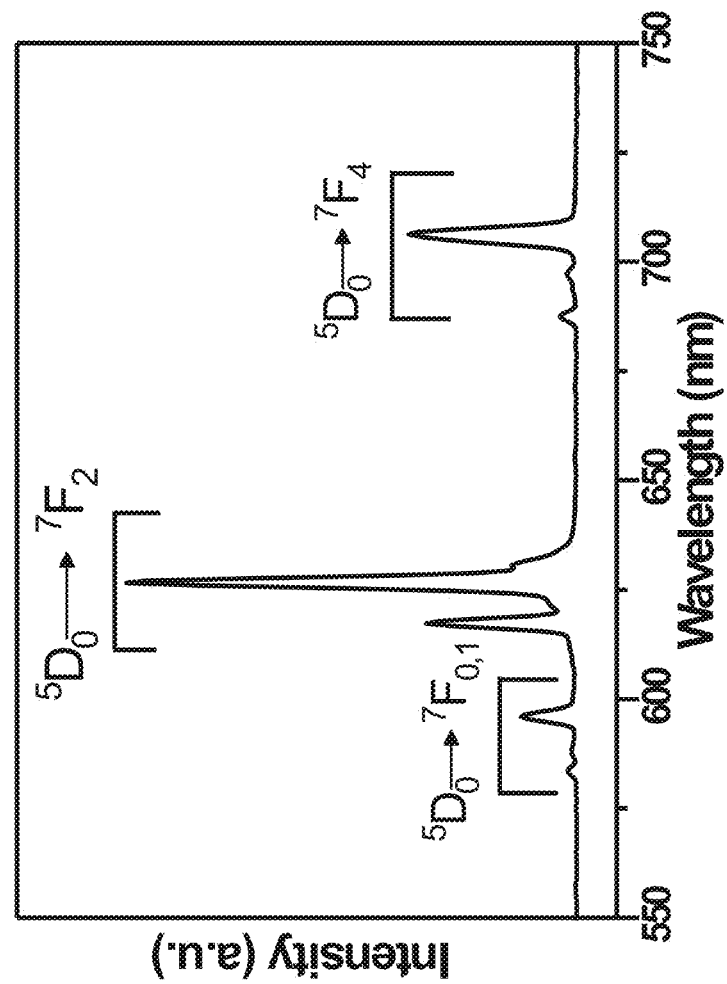
FIG. 2 shows the emission spectrum of gadolinium oxysulfide doped with $Eu^{3+}$ at a dopant concentration of 6 mol %.

FIG. 2 shows the emission spectrum of $Gd_2O_2S:Eu^{3+}$. According to Kasha's rule, emission takes place from the lowest excited state which is $^5D_0$. The transition $^5D_0 \rightarrow {}^7F_{0,1}$ in the emission spectrum occurs at higher wavelengths compared to the corresponding transition $^7F_{0,1} \rightarrow {}^5D_0$ in the absorption spectrum as a result of the Stokes shift.

Figure 3:
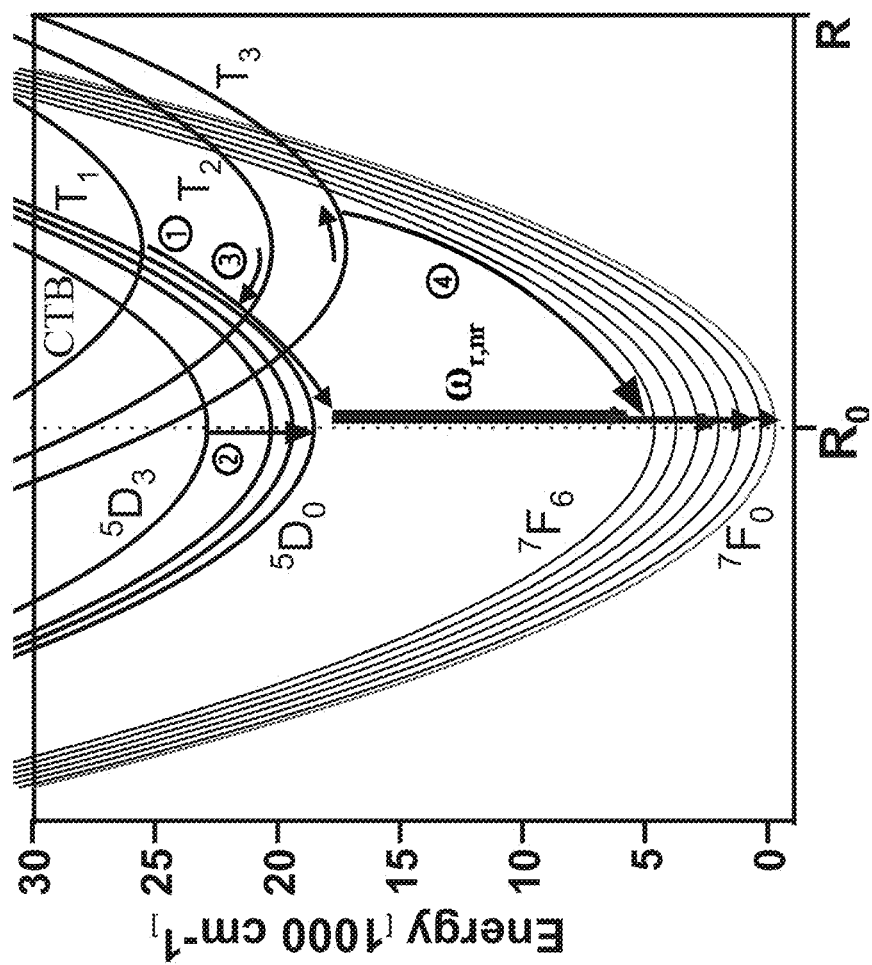
FIG. 3 shows the mechanism of photoluminescence decay underlying gadolinium oxysulfide doped with $Eu^{3+}$.

FIG. 3 shows the mechanism of photoluminescence decay underlying the rare earth element phosphor $Gd_2O_2S:Eu^{3+}$, which is characterized by delayed emission. In order to allow such delayed emission, the emissive state $^5D_0$ of the trivalent europium ions needs to be repopulated. Such repopulation is accomplished, for example, by the above-mentioned charge-transfer band between $S^{2-}$ from the host material and the dopant $Eu^{3+}$. Exciting $Gd_2O_2S:Eu^{3+}$ at around 350 nm results in direct population of the charge-transfer band. As can be seen in FIG. 3, the energy of the charge-transfer band is dependent on the temperature. As the temperature is raised, the charge-transfer band is shifted to lower energies. The locations of the charge-transfer band at three different temperatures ($T_1<T_2<T_3$) are schematically shown in FIG. 3. As the excited state in the charge-transfer band relaxes to the minimum of the charge-transfer band parabola, it crosses the excited state energy levels of $Eu^{3+}$. There is a chance that the energy transfers to $Eu^{3+}$ in this initial crossing. The energy transferred leads to prompt emission. However, in case the minimum of the charge-transfer band parabola is reached without crossing the excited state energy levels of $Eu^{3+}$, thermal energy is required to leave this metastable state and to reach an excited state energy level of $Eu^{3+}$. This leads to delayed emission with photoluminescence lifetimes tunable from tens to hundreds of milliseconds, depending on the dopant concentration, i.e., the concentration of $Eu^{3+}$ in the present case. Also, due to the shifting of the charge-transfer band parabola with the temperature, the photoluminescence lifetime accompanying the delayed emission is highly sensitive to temperature changes. This shifting may be suitably used for applications like temperature sensing.

Although the mechanism of delayed emission is explained herein for $Gd_2O_2S:Eu^{3+}$, the rare earth element of the host material is not limited to gadolinium, taking into account that the rare earth element of the host material is not involved in the electron transfer between $O^{2-}$, $S^{2-}$ and $Eu^{3+}$, which gives rise to the charge-transfer band responsible for the delayed emission. In particular, various rare earth element oxysulfides doped with $Eu^{3+}$ exhibit a similar temperature dependence, regardless of the respective rare earth element of the host material.

As mentioned above, without limitation, the dopant concentration, i.e., the concentration of the trivalent europium ions or the concentration of the divalent europium ions, may be in the range of from 0.001 to 20 mol %, such as in the range of from 0.1 to 20 mol %, based on the molar amount of the rare earth element oxysulfide or strontium aluminate used as the host material. For example, the dopant concentration may be in the range of from 0.5 to 15 mol % based on the molar amount of the host material, without, however, being limited thereto. By adjusting the dopant concentration within the above-indicated ranges, it is possible to tune the photoluminescence lifetime of the photonic marker so that it falls within the range of from 20 to 1000 ms, e.g., from 100 to 1000 ms, at room temperature. However, the present invention also encompasses embodiments where the photoluminescence lifetime exceeds 1000 ms. Accordingly, the photonic marker exhibits a photoluminescence lifetime which can be determined by analyzing a sequence of video frames taken by a low frame rate camera, e.g., a standard video camera, such as the camera of a smartphone or the camera of a tablet computer, operating, e.g., in the range of from 20 to 2000 frames per second, in the range of from 20 to 1000 frames per second, in the range of from 20 to 500 frames per second, in the range of from 20 to 250 frames per second (fps=frames/s=frames×Hz), or more specifically in the range of from 30 to 120 frames per second. In order to keep the evaluation of the photoluminescence rapid, the photoluminescence lifetime of the photonic marker should not exceed 1 second at room temperature. Generally, the maximum photoluminescence lifetime which is still applicable is only limited by how long a video can be recorded in order to determine the photoluminescence lifetime.

As surprisingly found by the present inventors, the photoluminescence lifetime accompanying the delayed emission results from doping the host material with $Eu^{3+}$ or $Eu^{2+}$ at rather small concentrations, e.g., at a dopant concentration in the range of from 0.001 to 20 mol %, such as in the range of from 0.1 to 20 mol %, based on the molar amount of the rare earth element oxysulfide or strontium aluminate used as the host material.

It is assumed that an optimal concentration of the dopant, i.e., a dopant concentration which may be in the above-mentioned concentration range, optimizes excited state energy transfer into the charge transfer band and modifies the charge transfer state lifetime.

Figure 4:
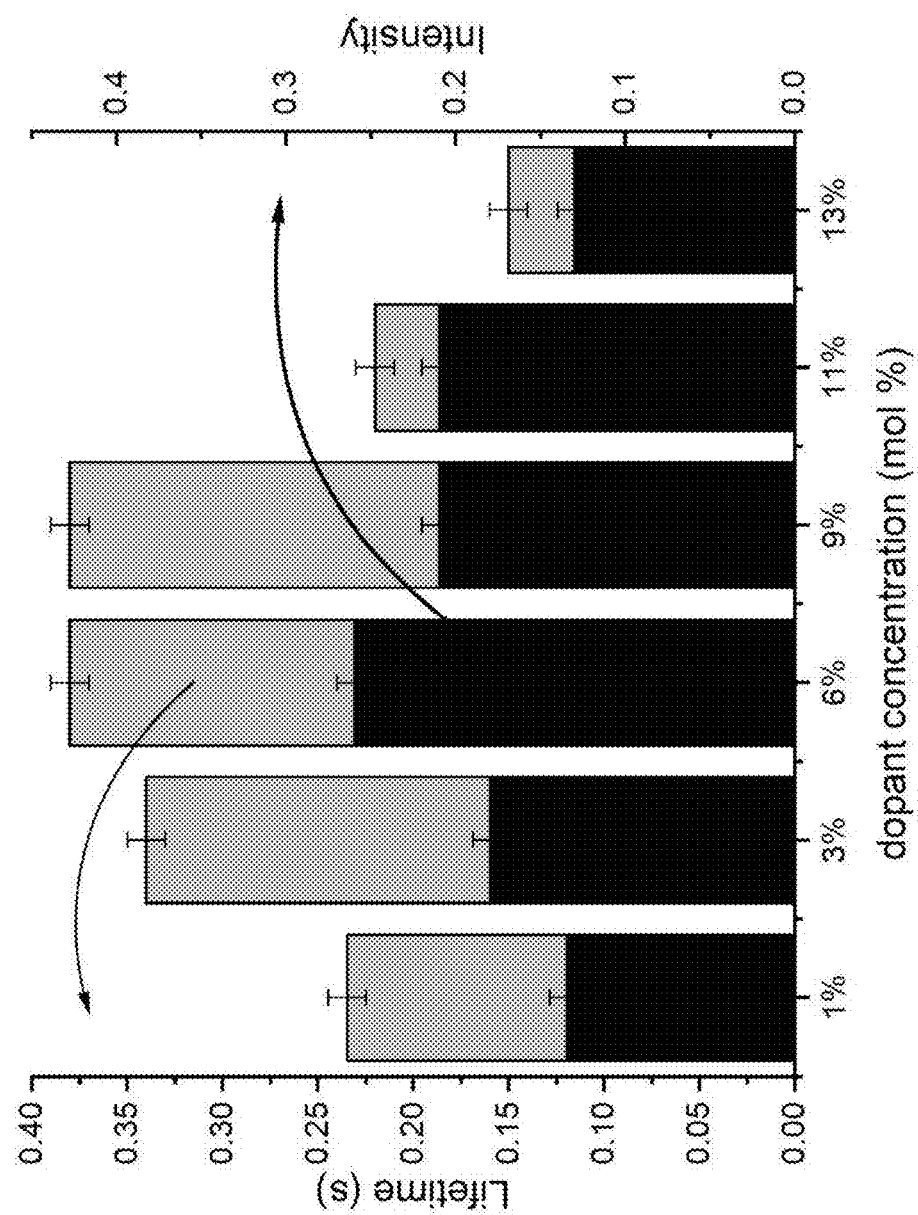
FIG. 4 shows the photoluminescence lifetime and the photoluminescence intensity of gadolinium oxysulfide doped with $Eu^{3+}$ as a function of the dopant concentration.

FIG. 4 shows the photoluminescence lifetime and the photoluminescence intensity of $Gd_2O_2S:Eu^{3+}$ as a function of the dopant concentration. As can be seen in FIG. 4, the photoluminescence lifetime measured at 298 K varies with the concentration of the dopant in the host material and reaches a maximum. Specifically, as can be seen in FIG. 4, by varying the dopant concentration, the photoluminescence lifetime of the photonic marker can be tuned on the order of tens to hundreds of milliseconds. Herein, it is also referred to as delayed photoluminescence lifetime.

In addition to the delayed photoluminescence lifetime, FIG. 4 also shows the relative photoluminescence intensity of the delayed emission of $Gd_2O_2S:Eu^{3+}$ as a function of the dopant concentration. The intensity of the delayed photoluminescence roughly correlates with the delayed photoluminescence lifetime, and is sufficient to be detected with a standard video camera.

Methods for preparing rare earth element phosphors are well known in the art. For example, as described in Materials Chemistry and Physics, 16 (1987) 253-281, rare earth element oxysulfides doped with an emitter/activator ion can be prepared via flux-assisted solid-state reaction. The procedure involves mole ratio mixing a rare earth element starting material with the emitter/activator ion in a sulfur rich environment. The as obtained ratios are then thoroughly mixed with various mole ratios of fluxing agents such as $Na_2CO_3$, $K_2CO_3$, $Li_2CO_3$, $K_3PO_4$ and $Li_3PO_4$. The resulting products are annealed at high temperatures in a furnace, let to cool to room temperature and then cleaned. This well-established procedure can also be suitably used to prepare the photonic marker according to an aspect of the present invention, using $Eu^{3+}$ or $Eu^{2+}$ as the emitter/activator ion for the host material.

Figure 5:
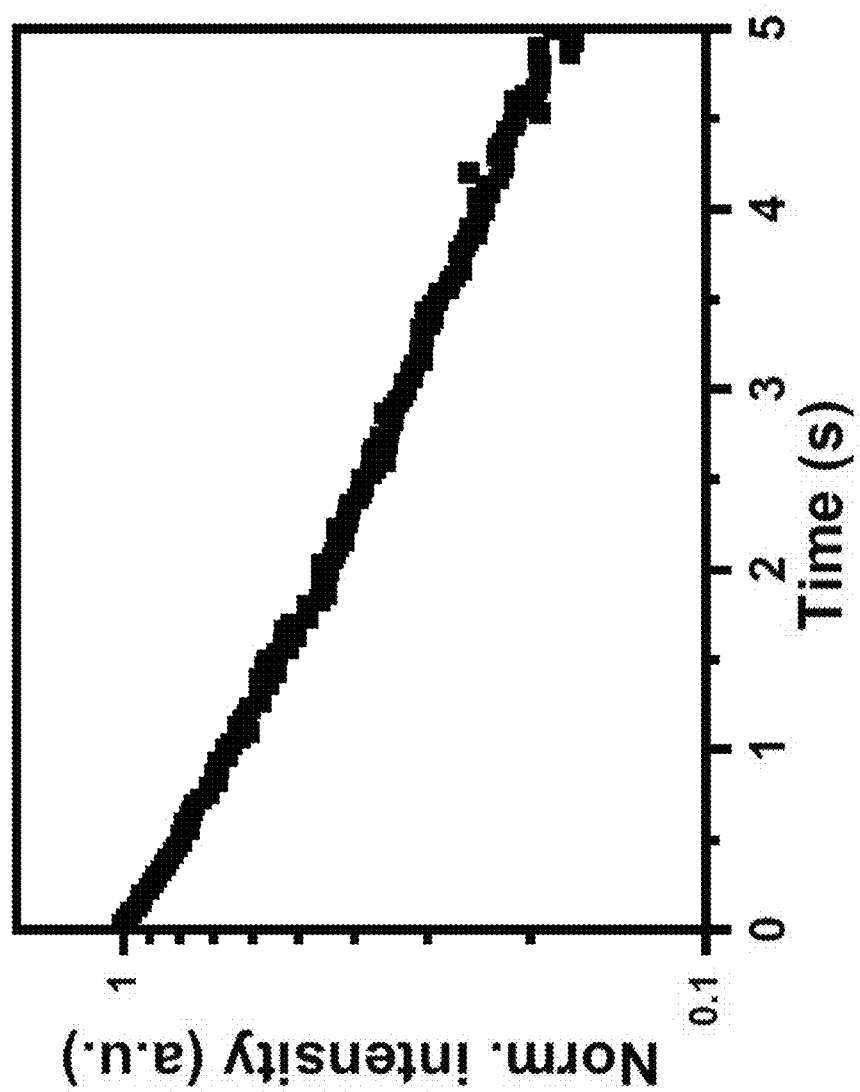
FIG. 5 shows the photoluminescence intensity of a strontium aluminate phosphor as a function of the time.

FIG. 5 shows the photoluminescence intensity of a strontium aluminate phosphor as a function of the time. As it is the case with the rare earth element phosphors described herein, the strontium aluminate phosphor shown in FIG. 5 also exhibits delayed emission accompanied by a delayed photoluminescence lifetime.

As an exemplary strontium aluminate phosphor, strontium aluminate doped with $Eu^{2+}$ or $Eu^{3+}$, preferably $Eu^{2+}$, and codoped with $Dy^{3+}$ may be mentioned. Without limitation, $Sr_{0.95}Eu_{0.02}Dy_{0.03}Al_2O_4$ may be mentioned as an exemplary photonic marker.

Methods for preparing strontium aluminate phosphors are also well known in the art.

The system for evaluating the photoluminescence of a photonic marker according to an aspect of the present invention comprises at least one photonic marker as defined above, and an excitation unit configured to excite the at least one photonic marker so that the at least one photonic marker emits photoluminescence, the intensity of which decays over time.

For the system according to an aspect of the present invention, the definitions provided above for the photonic marker according to an aspect of the present invention equally apply.

As the excitation unit, a pulsed light source having an excitation wavelength in the range of from 300 to 700 nm may be used for exciting the charge-transfer band of the photonic marker. As can be seen in FIG. 1, $Gd_2O_2S:Eu^{3+}$, for example, can be excited at around 350 nm, i.e., close to the visible spectrum. Advantageously, a low cost pulsed light source, such as a modulated light-emitting diode (LED) flash, may be used herein. The light source may be part of a portable electronic device, e.g., a smartphone or a tablet computer. Alternatively, the light source may be provided independently from the portable electronic device.

As required, the system may further comprise a detection unit configured to detect the photoluminescence intensity of the at least one photonic marker in a time-resolved manner. As the detection unit, a video camera having a frame rate of equal to or more than 20 fps and equal to or less than 2000 fps, preferably equal to or less than 1000 fps may be used. Generally, the frame rate should be such that the photoluminescence lifetime of the photonic marker is more than twice the inverse of the framerate at room temperature. In other words, in case of a photoluminescence lifetime of more than 100 ms at room temperature, for instance, a frame rate of 20 fps is sufficient. Since the photoluminescence lifetime of the photonic marker according to an aspect of the present invention is sufficiently long, i.e., on the order of tens to hundreds of milliseconds, a standard video camera may be used, as mentioned above. Such a standard video camera may be equipped with a charge-coupled device (CCD) image sensor or with a complementary metal-oxide-semiconductor (CMOS) image sensor. Herein, as far as the upper limit of the frame rate is concerned, the detection unit is not particularly limited. Standard video cameras typically have frame rates of 2000 fps or less, 1000 fps or less, 500 fps or less, or 250 fps or less. The video camera may be part of a portable electronic device, such as a smartphone or a tablet computer.

Accordingly, since the photonic marker according to an aspect of the present invention has a delayed photoluminescence lifetime, the system according to an aspect of the present invention allows for evaluating the photoluminescence of the photonic marker without the need of any specialized detectors which would cause high costs and would require complicated handling. Thus, the photonic marker according to an aspect of the present invention can be suitably used for temperature sensing and/or security marking, as described in detail below.

Figure 6:
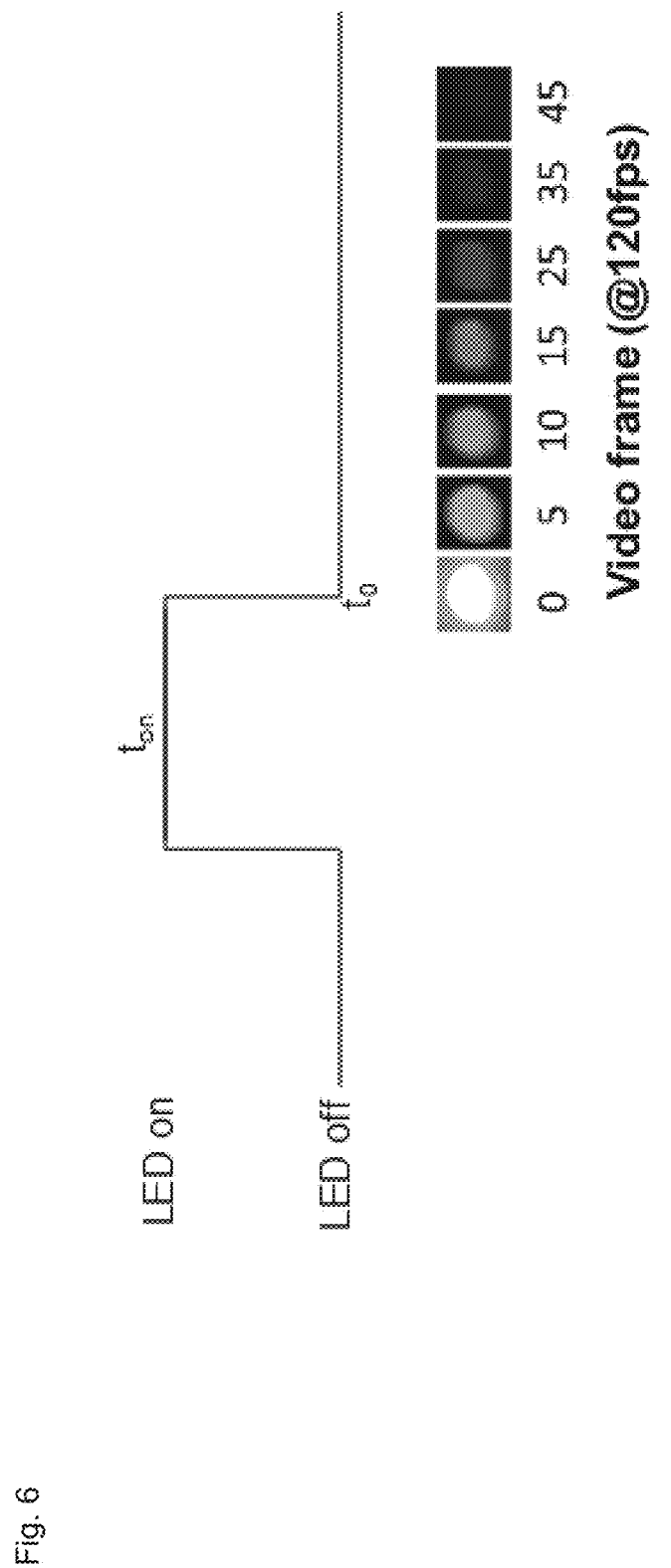
FIG. 6 shows video frames of the time-resolved photoluminescence intensity of an exemplary photonic marker along with the excitation intensity as a function of the number of video frames.

FIG. 6 shows video frames of the time-resolved photoluminescence intensity of an exemplary photonic marker along with the excitation intensity as a function of the number of video frames. The video frames are taken by a standard video camera operated at 120 fps using a modulated LED flash for excitation. As can be seen in FIG. 6, frame zero ($t_0$) is defined to be the last frame in which the excitation is still turned on ($t_{on} \leq t_0$). The photoluminescence intensity of the photonic marker is easily detectable in the subsequent frames. An analysis of the photoluminescence intensity in a given region as a function of the frame number, i.e., as a function of the time, allows the photoluminescence lifetime in said given region to be determined. However, for many applications, it can be sufficient to visually evaluate the photoluminescence of the photonic marker without quantitatively determining the photoluminescence lifetime thereof. Further, in some embodiments, it is even possible to visually detect the photoluminescence intensity of the photonic marker without using a detection unit, e.g., in case the photoluminescence lifetime of the photonic marker is sufficiently long so as to be time-resolved by means of the human eye of an observer.

Herein, the system may comprise at least one photonic marker, i.e., the system is not restricted to only one photonic marker, and it may comprise two, three, four or even more photonic markers, depending on the application. In such a case, the system is configured to evaluate the photoluminescence of each of said photonic markers, i.e., it is configured to excite each of said photonic markers so that each of said photonic markers emits photoluminescence, the intensity of which decays over time, and configured to detect the photoluminescence intensity of each of said photonic markers in a time-resolved manner.

Figure 7:
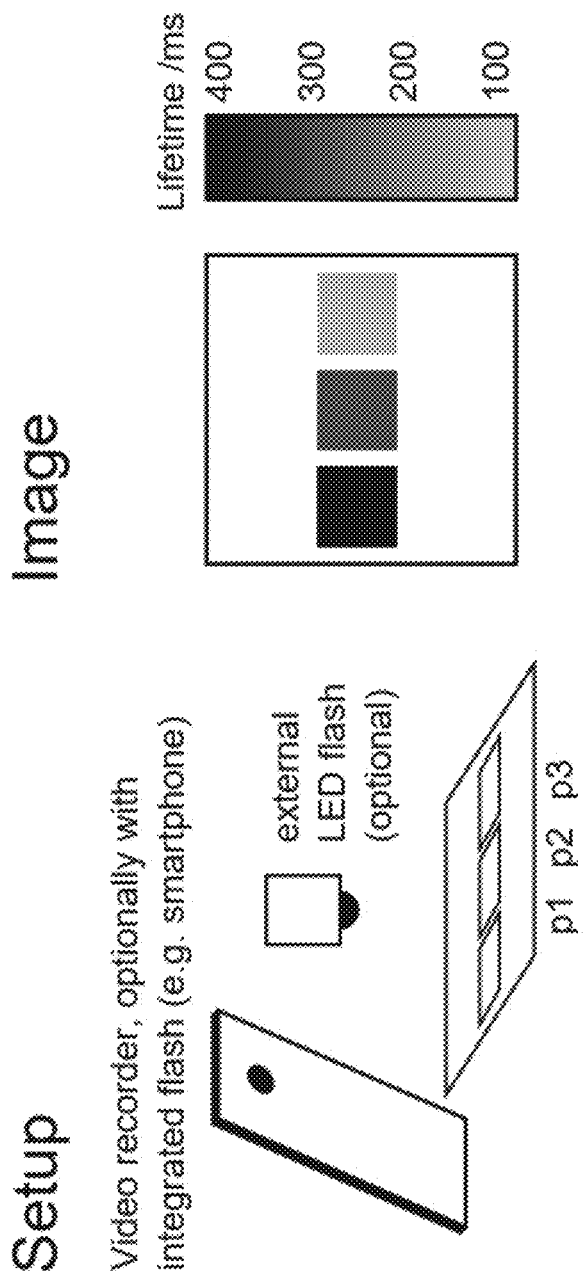
FIG. 7 shows a schematic system with three exemplary photonic markers added to a sample.

FIG. 7 shows a schematic system with three exemplary photonic markers added to a sample. A modulated LED flash is used as the excitation unit. As the detection unit, a video camera of a smartphone is used. As can be seen in FIG. 7, different photonic markers which exhibit different photoluminescence lifetimes may be suitably added to different regions of a sample. Thus, it is possible to individually evaluate the photoluminescence of said photonic markers and, as required, to determine the photoluminescence lifetimes thereof by independently analyzing the different regions of the sample.

As mentioned above, a qualitative analysis of the time-resolved photoluminescence intensity may be sufficient in many cases, i.e., the quantitative determination of the photoluminescence lifetime is not necessary, in particular when the system comprises two or more photonic markers with different photoluminescence lifetimes.

Figure 8:
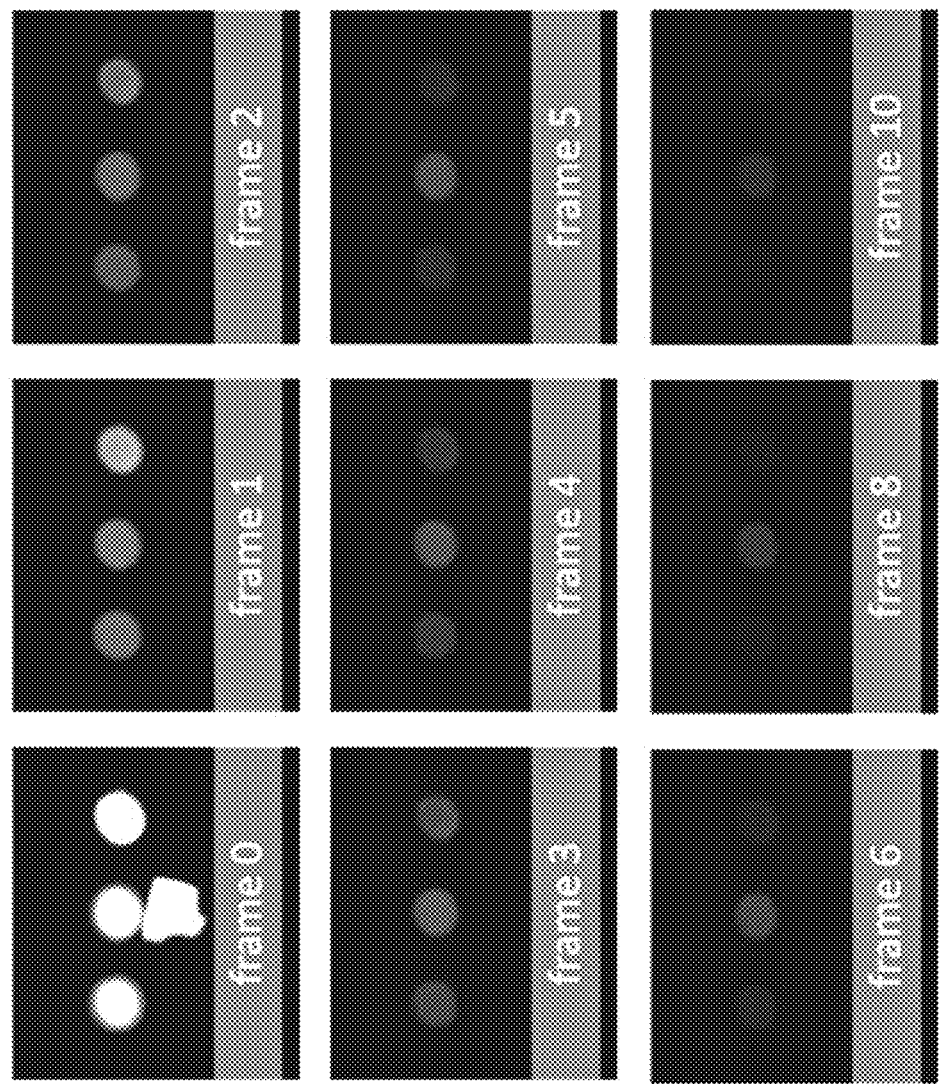
FIG. 8 shows video frames of the time-resolved photoluminescence intensity of three exemplary photonic markers having different photoluminescence lifetimes along with a reference photonic marker.

FIG. 8 shows video frames of the time-resolved photoluminescence intensity of three exemplary photonic markers having different photoluminescence lifetimes along with a reference photonic marker. After the excitation light has been turned off (frame zero) and as the time progresses, it can be appreciated that the faster decaying photonic markers stop emitting, leaving only the photoluminescence of the longer emitting photonic markers visible. Often, it is sufficient to visually inspect the time evolution of the video frames in a qualitative manner. As required, more elaborate methods to compare the changes between successive frames may be employed, and a comparison with the expected photoluminescence decay behavior may be made. As can be seen in FIG. 8, a reference photonic marker is included as well. The photoluminescence intensity thereof is not visible for multiple frames, and its photoluminescence lifetime cannot be determined using a standard video camera due to its low frame rate.

Figure 9:
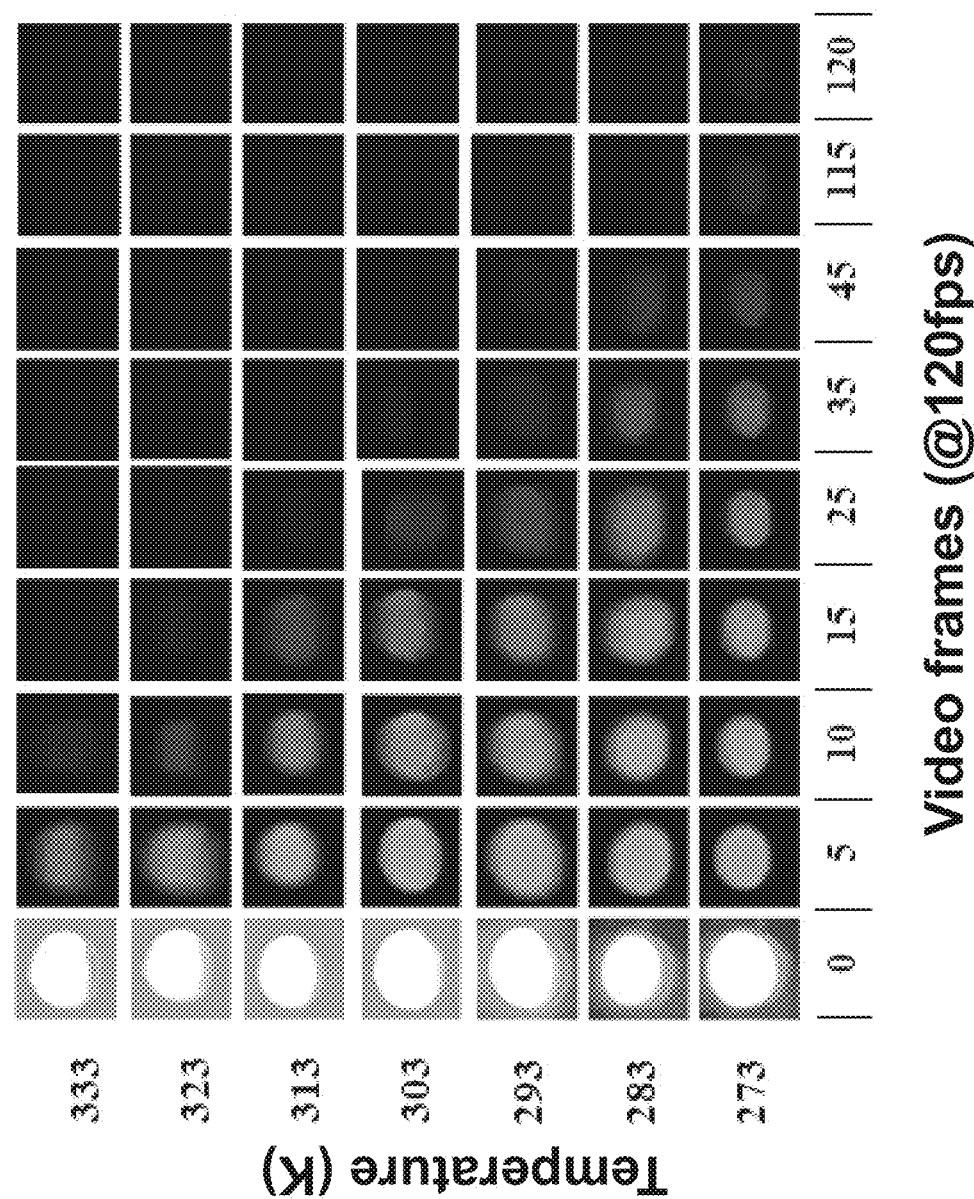
FIG. 9 shows video frames of the time-resolved photoluminescence intensity of an exemplary photonic marker as a function of both the number of video frames and the temperature.

As mentioned above, the photoluminescence decay of the photonic marker is dependent on the temperature. FIG. 9 shows video frames of the time-resolved photoluminescence intensity of an exemplary photonic marker as a function of both the number of video frames and the temperature. As can be seen in FIG. 9, the higher the temperature the faster the photoluminescence decay.

Figure 10:
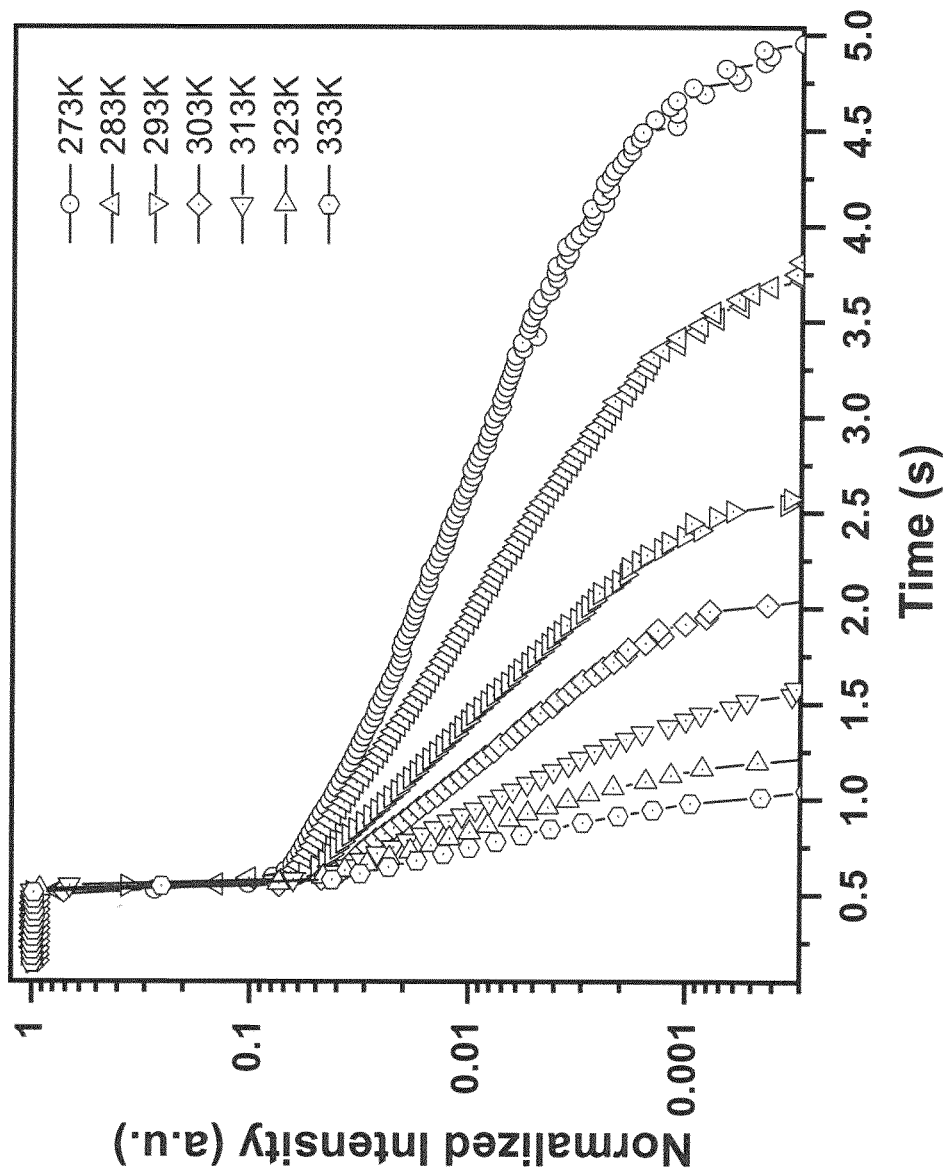
FIG. 10 shows the photoluminescence intensity of an exemplary photonic marker as a function of the time on a logarithmic scale for various temperatures.
Figure 11:
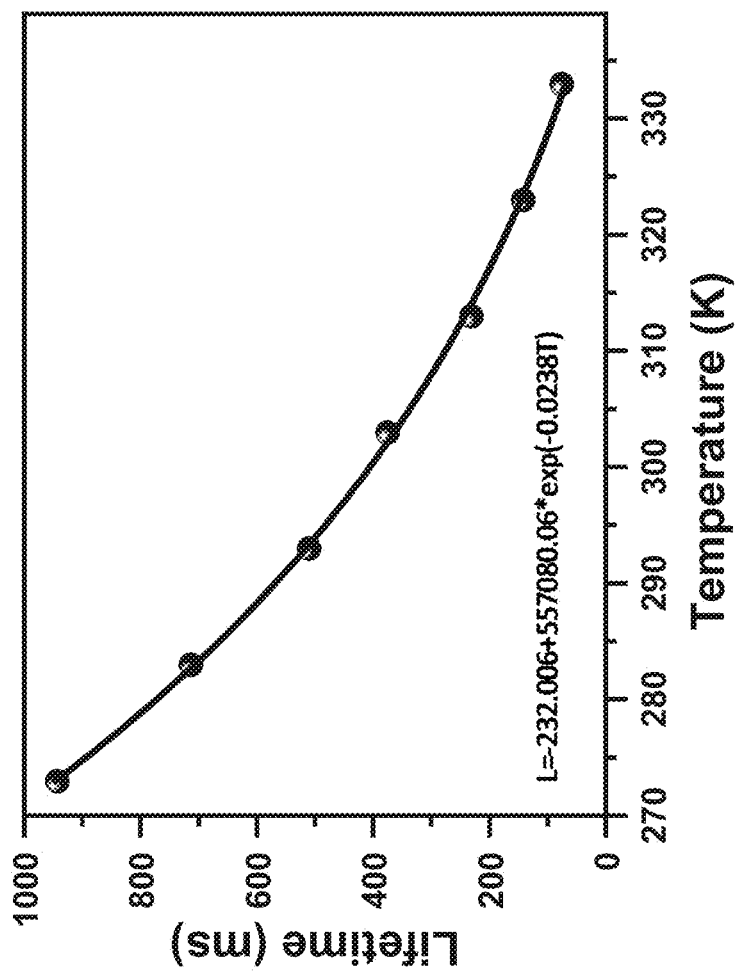
FIG. 11 shows the photoluminescence lifetime of an exemplary photonic marker as a function of the temperature.

Further, FIG. 10 shows the photoluminescence intensity of an exemplary photonic marker as a function of the time on a logarithmic scale for various temperatures, and FIG. 11 shows the photoluminescence lifetime of an exemplary photonic marker as a function of the temperature. As can be seen in FIGS. 10 and 11, the photoluminescence lifetime decreases with increasing temperature. For a specific temperature, each photonic marker exhibits a characteristic photoluminescence behavior, including a unique photoluminescence lifetime. Thus, the photonic marker according to an aspect of the present invention can be suitably used for determining the temperature of a sample to which it is added.

For this purpose, the system further comprises a determination unit for temperature sensing configured to determine the temperature of a sample to which the at least one photonic marker is added by comparing the time-resolved photoluminescence intensity of the at least one photonic marker with a predetermined temperature-dependent photoluminescence profile of the at least one photonic marker. Accordingly, by comparing the time-resolved photoluminescence intensity or, as required, the photoluminescence lifetime obtainable therefrom, with the predetermined temperature-dependent photoluminescence profile, it is possible to determine the temperature of the sample to which the photonic marker is added.

Alternatively, instead of determining the temperature of a sample, or in addition thereto, the photonic marker according to an aspect of the present invention can be suitably used for determining the authenticity of a sample to which it is added.

For this purpose, the system further comprises a determination unit for security marking configured to determine the authenticity of a sample to which the at least one photonic marker is added by comparing the time-resolved photoluminescence intensity of the at least one photonic marker with a predetermined photoluminescence profile of the at least one photonic marker at a given temperature. Accordingly, by comparing the time-resolved photoluminescence intensity or, as required, the photoluminescence lifetime obtainable therefrom, with the predetermined photoluminescence profile at a given temperature, it is possible to affirm or deny the presence of the photonic marker. In other words, it is possible to determine the authenticity of the sample to which the photonic marker is added. Since the photoluminescence lifetime of the photonic marker varies with the temperature, as shown in FIGS. 10 and 11, the temperature needs to be determined. This temperature determination may be accomplished using a second photonic marker as described above. In such an instance, two photonic markers in separate regions of the sample may be present. The first photonic marker may be used to determine the temperature of the sample, and the second photonic marker may be used to determine the authenticity of the sample.

Herein, one or more of the units of the system may be part of a portable electronic device. The portable electronic device may be a smartphone or a tablet computer. For example, all the units of the system, i.e., the excitation unit and, if present, the detection unit and the respective determination unit(s), may be part of such a portable electronic device.

For example, by using a smartphone or a tablet computer which is typically equipped with a modulated LED flash and a standard video camera, it is possible to both excite the at least one photonic marker and to detect the photoluminescence intensity thereof in a time-resolved manner. Further, the smartphone or the tablet computer allows to determine the temperature and/or to determine the authenticity of a sample by means of a computer program running on the smartphone or tablet computer. In order to do so, it is not required to quantitatively determine the photoluminescence lifetime of the at least one photonic marker. A qualitative comparison with the predetermined (temperature-dependent) photoluminescence profile may be sufficient in both cases.

Advantageously, using the photonic marker according to an aspect of the present invention for temperature sensing and/or security marking does not require any high-speed cameras for detecting the photoluminescence intensity thereof in a time-resolved manner, in contrast to the commercially available photonic markers which exhibit rather short photoluminescence lifetimes. Typically, the photoluminescence lifetimes of commercially available photonic markers are on the order of a few tens to hundreds of microseconds only. A standard video camera typically operates at 30 fps or 120 fps, which corresponds to a time delay of about 33 ms or about 8.3 ms between two subsequent frames. Hence, there is no emission left to be measured in the frame after the excitation is turned off. Consequently, a standard video camera with its frame rate of 30 fps or 120 fps cannot be used for evaluating the photoluminescence of commercially available photonic markers.

Even though some organic materials also exhibit a delayed emission which could be detected using low frame rate cameras, the use of such organic materials as photonic markers for temperature sensing and/or security marking is inferior, since the long-term stability of these photonic markers is poor, Besides, the photoluminescence lifetime of these organic materials is sensitive to oxygen, which makes lifetime-based imaging even more difficult.

The method for evaluating the photoluminescence of a photonic marker according to an aspect of the present invention comprises the steps of providing at least one photonic marker as defined above, exciting the at least one photonic marker so that the at least one photonic marker emits photoluminescence, the intensity of which decays over time, and detecting the photoluminescence intensity of the at least one photonic marker in a time-resolved manner.

For the method according to an aspect of the present invention, the definitions provided above for the photonic marker according to an aspect of the present invention and for the system according to an aspect of the present invention equally apply.

Evaluating the photoluminescence of the photonic marker allows for temperature sensing. For this purpose, the method further comprises the step of determining the temperature of a sample to which the at least one photonic marker is added by comparing the time-resolved photoluminescence intensity of the at least one photonic marker with a predetermined temperature-dependent photoluminescence profile of the at least one photonic marker.

Alternatively, or in addition thereto, evaluating the photoluminescence of the photonic marker allows for security marking. For this purpose, the method further comprises the step of determining the authenticity of a sample to which the at least one photonic marker is added by comparing the time-resolved photoluminescence intensity of the at least one photonic marker with a predetermined photoluminescence profile of the at least one photonic marker at a given temperature.

Without being limited, in case the photoluminescence lifetime of the photonic marker shall be determined, the following procedure may be carried out:

First of all, a video of the sample to which the photonic marker is added is recorded during and after a flash excitation. In this instance, the length of the flash is selected so that the photonic marker reaches steady state. Then, the video is analyzed, frame by frame, and the photoluminescence intensity for each pixel or group of pixels is determined from the series of recorded frames. The timescale of the time-resolved photoluminescence intensity data is determined by the timestamps of the frames or the frame rate. The initial photoluminescence intensity during the flash is normalized to a value of 1. Herein, the time at which the flash turns off is found by running an edge-finding algorithm on the data. This time is taken to be to. Then, the decay of the photoluminescence intensity as a function of time is fit between $t_1$ and $t_2$. To determine $t_1$, a fixed offset from to is selected, such as 50 to 300 ms. To determine $t_2$, the integral of the intensity as a function of the time is recorded from $t_1$. The time at which the integrated photoluminescence intensity becomes greater than a given percentage, such as 90% of the maximum photoluminescence intensity, is taken as $t_2$, being characteristic for a specific photonic marker as well as for a specific temperature. The photoluminescence decay between $t_1$ and $t_2$ may then be fit by a single exponential using standard algorithms (exponential decay of intensity). The photoluminescence lifetime for each pixel or group of pixels can then be displayed as a false color image or by any other visualization method, as required. The above procedure is summarized in FIG. 12.

Figure 12:
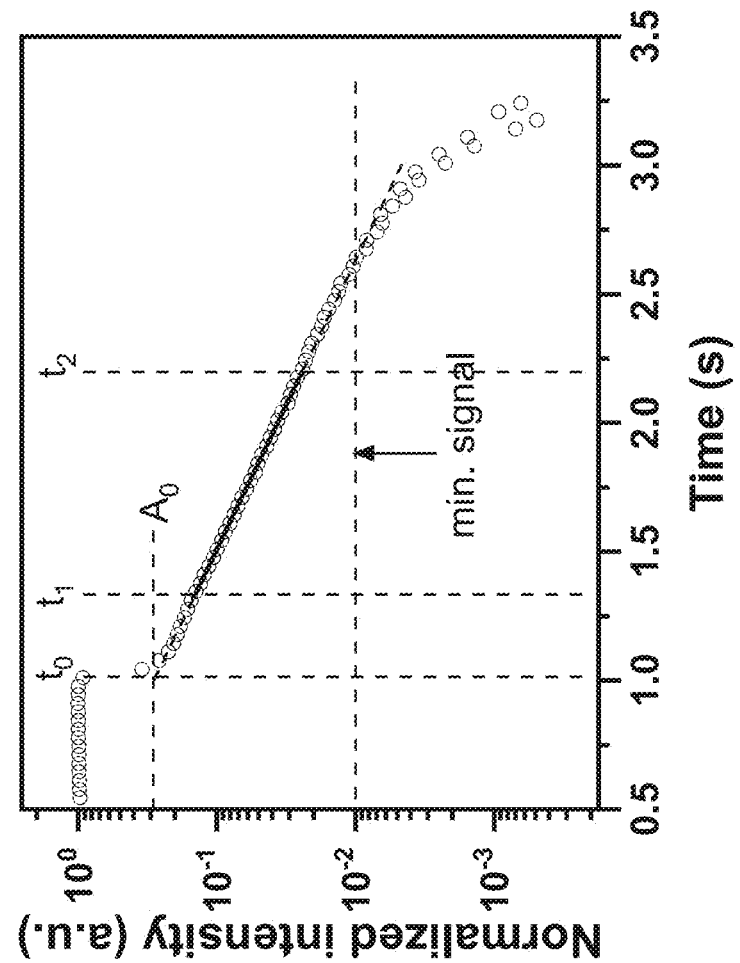
FIG. 12 shows the photoluminescence intensity of an exemplary photonic marker as a function of the time on a logarithmic scale along with different labels for determining the photoluminescence lifetime.

FIG. 12 shows the pixel intensity as a function of time processed from an analysis of the video frames on a logarithmic scale, Determination of $t_0$ is by edge detection. Addition of a fixed offset to $t_0$ gives $t_1$. Integration of the intensity from $t_1$ allows $t_2$ to be found as the time at which the integrated photoluminescence intensity reaches a given percentage of the maximum integrated photoluminescence intensity. $A_0$ is the amplitude of the exponential fit of the delayed emission at $t_0$, The higher $A_0$ the better. The minimum signal detectable is limited by the detection unit, and is around 1% of the maximum signal, as can be seen from the non-linearity in the logarithmic plot. The above procedure may be suitably carried out with the computer-program product described below.

The computer-program product for evaluating the photoluminescence of a photonic marker according to an aspect of the present invention comprises computer-readable instructions, which when loaded and run by a processor of an electronic device, cause the electronic device to perform a method comprising the steps of generating and outputting an excitation signal to an excitation unit for exciting at least one photonic marker as defined above so that the at least one photonic marker emits photoluminescence, the intensity of which decays over time, and detecting, by a detection unit, the photoluminescence intensity of the at least one photonic marker in a time-resolved manner.

For the computer-program product according to an aspect of the present invention, the definitions provided above for the photonic marker according to an aspect of the present invention, for the system according to an aspect of the present invention and for the method according to an aspect of the present invention equally apply.

For example, the electronic device may be a portable electronic device, such as a mobile phone, e.g, a smartphone, or a tablet computer.

The computer-program product can be used for temperature sensing. For this purpose, the computer-program product and the method to which it relates further comprise the step of determining, by a determination unit for temperature sensing, the temperature of a sample to which the at least one photonic marker is added by comparing the time-resolved photoluminescence intensity of the at least one photonic marker with a predetermined temperature-dependent photoluminescence profile of the at least one photonic marker.

Alternatively, or in addition thereto, the computer-program product can be used for security marking. For this purpose, the computer-program product and the method to which it relates further comprise the step of determining, by a determination unit for security marking, the authenticity of a sample to which the at least one photonic marker is added by comparing the time-resolved photoluminescence intensity of the at least one photonic marker with a predetermined photoluminescence profile of the at least one photonic marker at a given temperature.

Surprisingly, the photoluminescence lifetime of the photonic marker according to an aspect of the present invention is a function of the temperature. This makes the photonic marker ideally suited for temperature sensing. That is, the photonic marker can be used for sensing the temperature of a sample to which it is added. For example, in case the photonic marker uniformly covers the surface of a sample, it is possible to generate a temperature map across said surface.

Further, the photonic marker according to an aspect of the present invention is ideally suited for security marking. For example, the photonic marker can serve as an easily field-readable photonic security code on consumer goods, which allows for product authentication, thereby preventing counterfeiting.

Up to now, using commercially available photonic markers for the above applications, if at all possible, requires sophisticated equipment such as a raster scanning microscope coupled to a time-correlated single photon counting detection unit.

On the other hand, the photonic marker according to an aspect of the present invention allows for temperature sensing and/or security marking using low cost and easy-to-handle equipment, such as a modulated LED flash in combination with a low frame rate camera of a transportable electronic device, such as a smartphone or a tablet computer. The photonic marker according to an aspect of the present invention exhibits a delayed emission accompanied by a photoluminescence lifetime of tens to hundreds of milliseconds in combination with a high photoluminescence quantum yield. Further, in case the photoluminescence lifetime of the photonic marker is sufficiently long so as to be time-resolved by means of the human eye of an observer, the photoluminescence intensity thereof may be detected visually. Advantageously, the photonic marker is stable in both air and water even at higher temperatures. Furthermore, the photonic marker can be efficiently produced without the need of any wet chemical process steps at low temperatures, leading to excellent reproducibility of the photoluminescence decay behavior thereof.

Aspects, features and embodiments of the present invention will be further described by means of the following clauses:

1. A system for evaluating the photoluminescence of a photonic marker, the system comprising:
    at least one photonic marker comprising a host material selected from the group consisting of a rare earth element oxysulfide and strontium aluminate, wherein the host material is doped with a dopant selected from the group consisting of $Eu^{3+}$ and $Eu^{2+}$;
    an excitation unit configured to excite the at least one photonic marker so that the at least one photonic marker emits photoluminescence, the intensity of which decays over time; and
    a detection unit configured to detect the photoluminescence intensity of the at least one photonic marker in a time-resolved manner.
2. The system according to clause 1, wherein the host material is doped with the dopant at a dopant concentration in the range of from 0.1 to 20 mol % based on the molar amount of the host material such that there is a photoluminescence lifetime of the photonic marker in the range of from 20 to 1000 ms at room temperature.
3. The system according to clause 1 or 2, wherein the host material is further doped with $Dy^{3+}$ as a codopant.
4. The system according to clause 3, wherein the host material is doped with the codopant at a codopant concentration in the range of from 0.1 to 20 mol % based on the molar amount of the host material.
5. The system according to any one of clauses 1 to 4, wherein the detection unit is a video camera having a frame rate of equal to or more than 20 fps and equal to or less than 2000 fps, preferably equal to or less than 1000 fps,
6. The system according to any one of clauses 1 to 5, wherein the system further comprises:
    a determination unit for temperature sensing configured to determine the temperature of a sample to which the at least one photonic marker is added by comparing the time-resolved photoluminescence intensity of the at least one photonic marker with a predetermined temperature-dependent photoluminescence profile of the at least one photonic marker.
7. The system according to any one of clauses 1 to 6, wherein the system further comprises,
    a determination unit for security marking configured to determine the authenticity of a sample to which the at least one photonic marker is added by comparing the time-resolved photoluminescence intensity of the at least one photonic marker with a predetermined photoluminescence profile of the at least one photonic marker at a given temperature.
8. The system according to any one of clauses 1 to 7, wherein one or more of the units of the system are part of a portable electronic device.
9. A method for evaluating the photoluminescence of a photonic marker, the method comprising the steps of:
    providing at least one photonic marker comprising a host material selected from the group consisting of a rare earth element oxysulfide and strontium aluminate, wherein the host material is doped with a dopant selected from the group consisting of $Eu^{3+}$ and $Eu^{2+}$;

exciting the at least one photonic marker so that the at least one photonic marker emits photoluminescence, the intensity of which decays over time; and detecting the photoluminescence intensity of the at least one photonic marker in a time-resolved manner.
10. The method according to clause 9, wherein the method further comprises the step of:
determining the temperature of a sample to which the at least one photonic marker is added by comparing the time-resolved photoluminescence intensity of the at least one photonic marker with a predetermined temperature-dependent photoluminescence profile of the at least one photonic marker.
11. The method according to clause 9 or 10, wherein the method further comprises the step of:
determining the authenticity of a sample to which the at least one photonic marker is added by comparing the time-resolved photoluminescence intensity of the at least one photonic marker with a predetermined photoluminescence profile of the at least one photonic marker at a given temperature.
12. A computer-program product for evaluating the photoluminescence of a photonic marker, wherein the computer-program product comprises computer-readable instructions, which when loaded and run by a processor of an electronic device, cause the electronic device to perform a method comprising the steps of:
generating and outputting an excitation signal to an excitation unit for exciting at least one photonic marker comprising a host material selected from the group consisting of a rare earth element oxysulfide and strontium aluminate, wherein the host material is doped with a dopant selected from the group consisting of $Eu^{3+}$ and $Eu^{2+}$, so that the at least one photonic marker emits photoluminescence, the intensity of which decays over time; and
detecting, by a detection unit, the photoluminescence intensity of the at least one photonic marker in a time-resolved manner.
13. The computer-program product according to clause 12, wherein the method further comprises the step of:
determining, by a determination unit for temperature sensing, the temperature of a sample to which the at least one photonic marker is added by comparing the time-resolved photoluminescence intensity of the at least one photonic marker with a predetermined temperature-dependent photoluminescence profile of the at least one photonic marker.
14. The computer-program product according to clause 12 or 13, wherein the method further comprises the step of:
determining, by a determination unit for security marking, the authenticity of a sample to which the at least one photonic marker is added by comparing the time-resolved photoluminescence intensity of the at least one photonic marker with a predetermined photoluminescence profile of the at least one photonic marker at a given temperature.
15. A photonic marker for temperature sensing and/or security marking, comprising a host material selected from the group consisting of a rare earth element oxysulfide and strontium aluminate, wherein the host material is doped with a dopant selected from the group consisting of $Eu^{3+}$ and $Eu^{2+}$.
16. The photonic marker according to clause 15, wherein the host material is doped with the dopant at a dopant concentration in the range of from 0.1 to 20 mol % based on the molar amount of the host material such that there is a photoluminescence lifetime of the photonic marker in the range of from 20 to 1000 ms at room temperature.
17. The photonic marker according to clause 15 or 16, wherein the host material is further doped with $Dy^{3+}$ as a codopant.
18. The photonic marker according to clause 17, wherein the host material is doped with the codopant at a codopant concentration in the range of from 0.1 to 20 mol % based on the molar amount of the host material.
19. Use of at least one photonic marker according to any one of clause 15 to 18 for temperature sensing and/or security marking.

The invention claimed is:
1. A photonic marker system comprising:
at least one photonic marker comprising a host material selected from the group consisting of a rare earth element oxysulfide and strontium aluminate, wherein the host material is doped with $Eu^{3+}$ or $Eu^{2+}$ as a dopant;
a pulsed light source having an excitation wavelength in the range of from 300 to 700 nm for exciting the at least one photonic marker so that the at least one photonic marker emits photoluminescence, the intensity of which decays over time;
a video camera having a frame rate of equal to or more than 20 frames per second (fps) and equal to or less than 2000 fps for detecting a photoluminescence intensity of the at least one photonic marker in a time-resolved manner to determine a time-resolved photoluminescence intensity of the at least one photonic marker; and
a processor configured to determine a temperature of a sample to which the at least one photonic marker is added by comparing the time-resolved photoluminescence intensity of the at least one photonic marker with a predetermined temperature-dependent photoluminescence profile of the at least one photonic marker,
wherein both the light source and the video camera are part of a portable electronic device selected from the group consisting of a smartphone and a tablet computer.
2. The system according to claim 1, wherein the host material is doped with the dopant at a dopant concentration in a range of from 0.1 to 20 mol % based on the molar amount of the host material such that there is a photoluminescence lifetime of the at least one photonic marker in a range of from 20 to 1000 ms at room temperature.
3. The system according to claim 1, wherein the host material is further doped with $Dy^{3+}$ as a codopant.
4. The system according to claim 3, wherein the host material is doped with the codopant at a codopant concentration in a range of from 0.1 to 20 mol % based on the molar amount of the host material.
5. A photonic marker system comprising:
at least one photonic marker comprising a host material selected from the group consisting of a rare earth element oxysulfide and strontium aluminate, wherein the host material is doped with $Eu^{3+}$ or $Eu^{2+}$ as a dopant;
a pulsed light source having an excitation wavelength in the range of from 300 to 700 nm for exciting the at least one photonic marker so that the at least one photonic marker emits photoluminescence, the intensity of which decays over time;

a video camera having a frame rate of equal to or more than 20 frames per second (fps) and equal to or less than 2000 fps for detecting a photoluminescence intensity of the at least one photonic marker in a time-resolved manner to determine a time-resolved photoluminescence intensity of the at least one photonic marker; and a processor configured to determine an authenticity of a sample to which the at least one photonic marker is added by comparing the time-resolved photoluminescence intensity of the at least one photonic marker with a predetermined photoluminescence profile of the at least one photonic marker at a given temperature, wherein both the light source and the video camera are part of a portable electronic device selected from the group consisting of a smartphone and a tablet computer.

6. A method of using a photonic marker, the method comprising:

providing at least one photonic marker comprising a host material selected from the group consisting of a rare earth element oxysulfide and strontium aluminate, wherein the host material is doped with $Eu^{3+}$ or $Eu^{2+}$ as a dopant;

exciting the at least one photonic marker by a pulsed light source having an excitation wavelength in the range of from 300 to 700 nm so that the at least one photonic marker emits photoluminescence, the intensity of which decays over time;

detecting a photoluminescence intensity of the at least one photonic marker in a time-resolved manner by a video camera having a frame rate of equal to or more than 20 frames per second (fps) and equal to or less than 2000 fps to determine a time-resolved photoluminescence intensity of the at least one photonic marker; and determining a temperature of a sample to which the at least one photonic marker is added by comparing the time-resolved photoluminescence intensity of the at least one photonic marker with a predetermined temperature-dependent photoluminescence profile of the at least one photonic marker, wherein both the light source and the video camera are part of a portable electronic device selected from the group consisting of a smartphone and a tablet computer.

7. A method of using a photonic marker, the method comprising:

providing at least one photonic marker comprising a host material selected from the group consisting of a rare earth element oxysulfide and strontium aluminate, wherein the host material is doped with $Eu^{3+}$ or $Eu^{2+}$ as a dopant;

exciting the at least one photonic marker by a pulsed light source having an excitation wavelength in the range of from 300 to 700 nm so that the at least one photonic marker emits photoluminescence, the intensity of which decays over time;

detecting a photoluminescence intensity of the at least one photonic marker in a time-resolved manner by a video camera having a frame rate of equal to or more than 20 frames per second (fps) and equal to or less than 2000 fps to determine a time-resolved photoluminescence intensity of the at least one photonic marker; and determining an authenticity of a sample to which the at least one photonic marker is added by comparing the time-resolved photoluminescence intensity of the at least one photonic marker with a predetermined photoluminescence profile of the at least one photonic marker at a given temperature, wherein both the light source and the video camera are part of a portable electronic device selected from the group consisting of a smartphone and a tablet computer.

8. A computer-program product for evaluating the photoluminescence of a photonic marker, wherein the computer-program product comprises computer-readable instructions, which when loaded and run by a processor of an electronic device, cause the electronic device to perform a method comprising:

generating and outputting an excitation signal to a pulsed light source having an excitation wavelength in the range of from 300 to 700 nm for exciting at least one photonic marker comprising a host material selected from the group consisting of a rare earth element oxysulfide and strontium aluminate, wherein the host material is doped with $Eu^{3+}$ or $Eu^{2+}$ as a dopant, so that the at least one photonic marker emits photoluminescence, the intensity of which decays over time;

detecting, by a video camera having a frame rate of equal to or more than 20 frames per second (fps) and equal to or less than 2000 fps, a photoluminescence intensity of the at least one photonic marker in a time-resolved manner to determine a time-resolved photoluminescence intensity of the at least one photonic marker; and determining, by a determination unit, a temperature of a sample to which the at least one photonic marker is added by comparing the time-resolved photoluminescence intensity of the at least one photonic marker with a predetermined temperature-dependent photoluminescence profile of the at least one photonic marker, wherein both the light source and the video camera are part of a portable electronic device selected from the group consisting of a smartphone and a tablet computer.

9. A computer-program product for evaluating the photoluminescence of a photonic marker, wherein the computer-program product comprises computer-readable instructions, which when loaded and run by a processor of an electronic device, cause the electronic device to perform a method comprising:

generating and outputting an excitation signal to a pulsed light source having an excitation wavelength in the range of from 300 to 700 nm for exciting at least one photonic marker comprising a host material selected from the group consisting of a rare earth element oxysulfide and strontium aluminate, wherein the host material is doped with $Eu^{3+}$ or $Eu^{2+}$ as a dopant, so that the at least one photonic marker emits photoluminescence, the intensity of which decays over time;

detecting, by a video camera having a frame rate of equal to or more than 20 frames per second (fps) and equal to or less than 2000 fps, a photoluminescence intensity of the at least one photonic marker in a time-resolved manner to determine a time-resolved photoluminescence intensity of the at least one photonic marker; and determining, by a determination unit, an authenticity of a sample to which the at least one photonic marker is added by comparing the time-resolved photoluminescence intensity of the at least one photonic marker with a predetermined photoluminescence profile of the at least one photonic marker at a given temperature, wherein both the light source and the video camera are part of a portable electronic device selected from the group consisting of a smartphone and a tablet computer.

* * * * *